(12) United States Patent
Asakura

(10) Patent No.: US 10,143,026 B2
(45) Date of Patent: Nov. 27, 2018

(54) COMMUNICATION DEVICE

(71) Applicant: BROTHER KOGYO KABUSHIKI KAISHA, Nagoya-shi, Aichi-ken (JP)

(72) Inventor: Hirotaka Asakura, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/471,311

(22) Filed: Mar. 28, 2017

(65) Prior Publication Data
US 2017/0289742 A1    Oct. 5, 2017

(30) Foreign Application Priority Data

Mar. 31, 2016    (JP) .................................. 2016-071815

(51) Int. Cl.
  *H04W 76/14*    (2018.01)
  *H04W 4/80*    (2018.01)
(52) U.S. Cl.
  CPC ............. *H04W 76/14* (2018.02); *H04W 4/80* (2018.02)
(58) Field of Classification Search
  CPC .... H04W 4/008; H04W 12/06; H04W 76/023
  USPC ....................................... 455/41.1
  See application file for complete search history.

(56) References Cited

U.S. PATENT DOCUMENTS

| | | | | |
|---|---|---|---|---|
| 2009/0286483 | A1* | 11/2009 | Kanemoto | H04L 63/0853 455/66.1 |
| 2014/0157386 | A1* | 6/2014 | Tanaka | H04L 63/0428 726/7 |
| 2014/0168687 | A1* | 6/2014 | Kim | H04N 1/00342 358/1.14 |
| 2015/0029532 | A1 | 1/2015 | Lee et al. | |
| 2015/0092225 | A1 | 4/2015 | Kaigawa | |

(Continued)

FOREIGN PATENT DOCUMENTS

| | | |
|---|---|---|
| JP | 2010-198505 A | 9/2010 |
| JP | 2015-069458 A | 4/2015 |

(Continued)

OTHER PUBLICATIONS

2010 Wi-Fi Alliance, Wi-Fi Peer-to-Peer (P2P) Technical Specification Version 1.1.
U.S. Appl. No. 15/712,607, filed Sep. 22, 2017.

*Primary Examiner* — Ayodeji Ayotunde
(74) *Attorney, Agent, or Firm* — Scully, Scott, Murphy & Presser, PC

(57) ABSTRACT

A communication device may receive a first signal including first identification information and attribute information from a target device via the wireless interface, determine which of a first type device or a second type device the target device is by using the attribute information, execute an authentication of the target device by using the first identification information in a case where it is determined that the target device is the first type device, and execute an authentication of the target device by using the second identification information in a case where it is determined that the target device is the second type device and a second signal including second identification information different from the first identification information is received via the wireless interface, the second signal is sent to the communication device from the second type device in accordance with a predetermined application software.

23 Claims, 8 Drawing Sheets

(56) References Cited

U.S. PATENT DOCUMENTS

2015/0096014 A1* 4/2015 Terashita ............... G06F 21/34
                                                        726/20
2015/0096015 A1   4/2015 Ren

FOREIGN PATENT DOCUMENTS

JP         2015-069509 A    4/2015
JP         2015-069559 A    4/2015

* cited by examiner

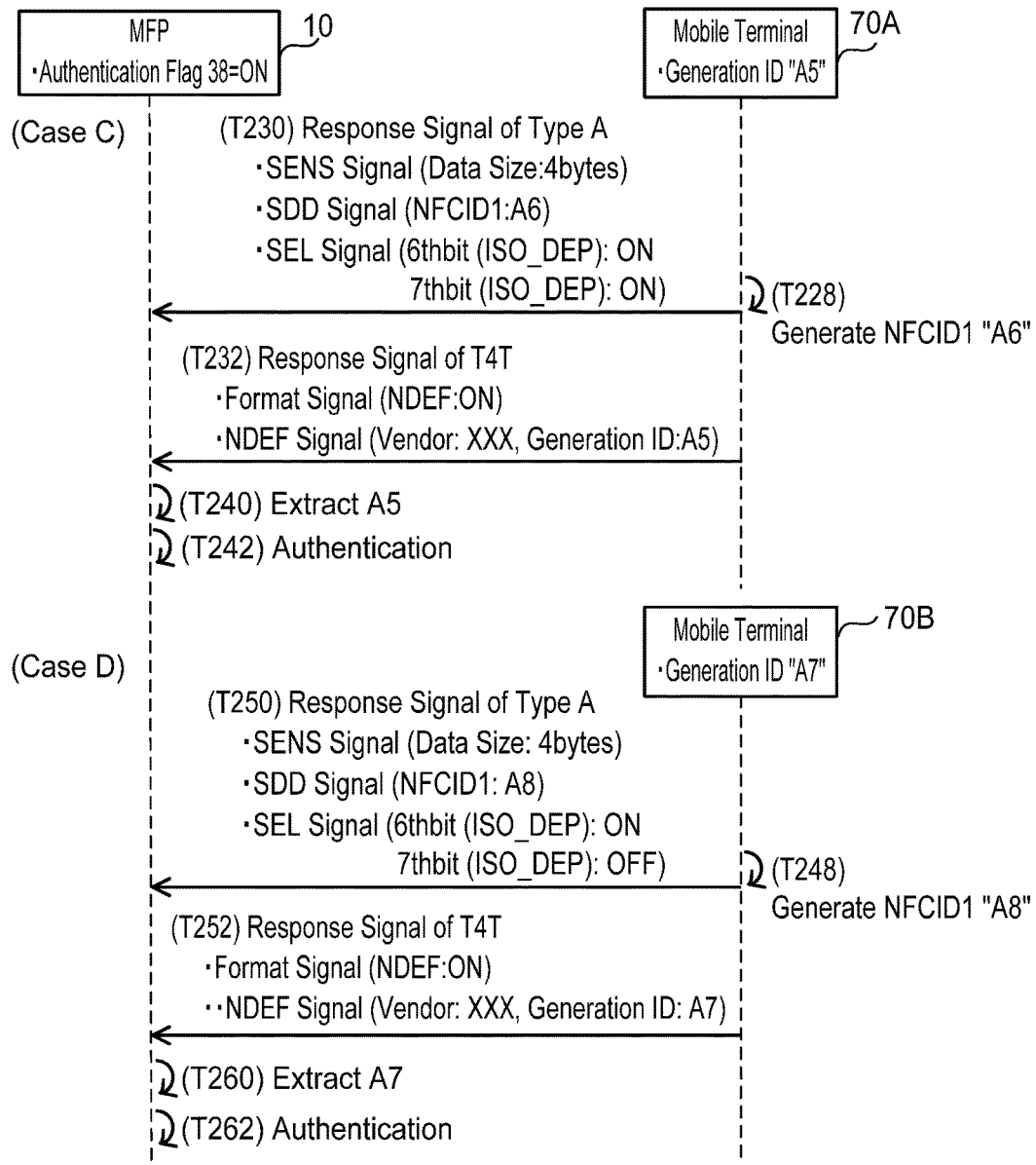

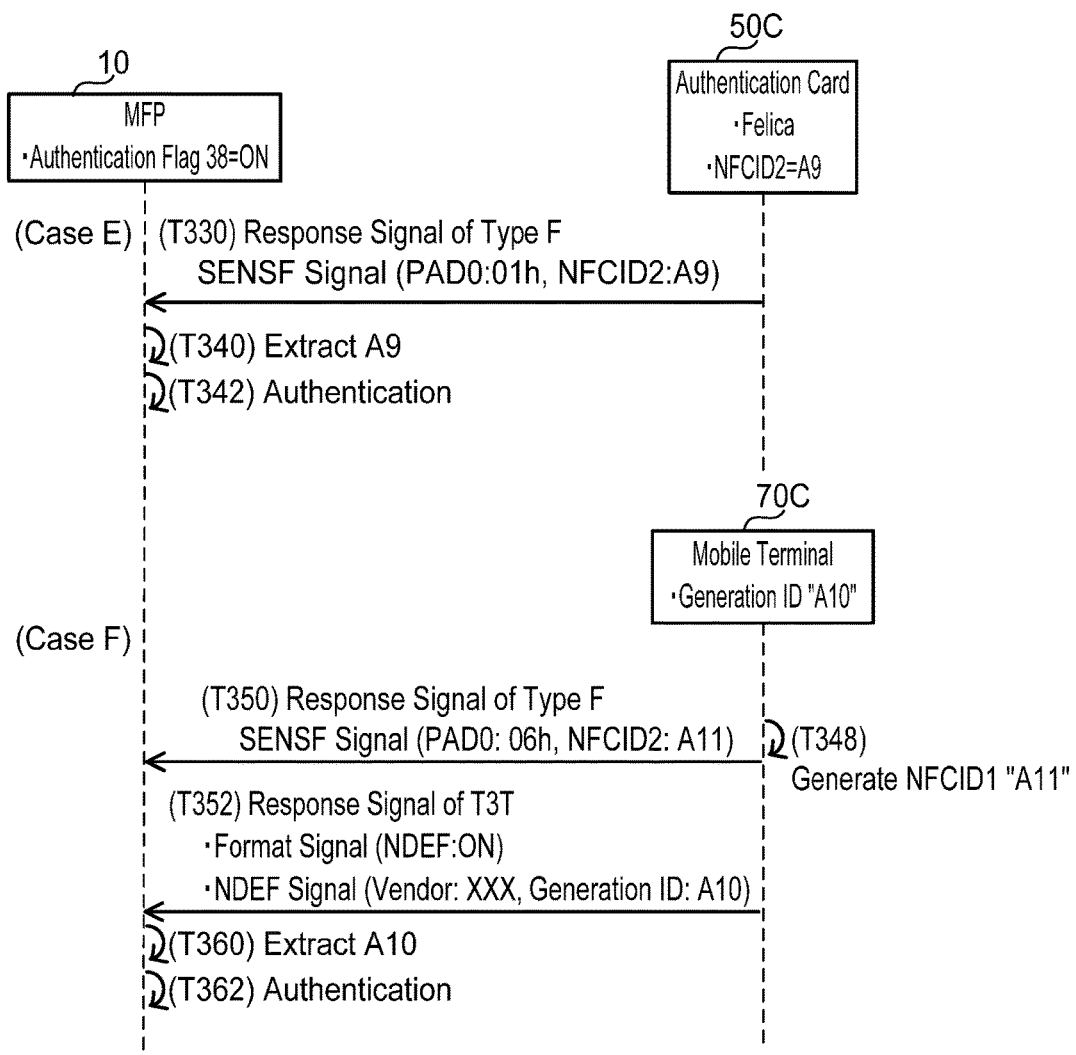

COMMUNICATION DEVICE

TECHNICAL FIELD

The present disclosure relates to a communication device capable of executing an authentication of a target device.

BACKGROUND ART

A technique is known relating to authentication using a terminal, a service providing device, and an authentication device. Using a non-contact IC card reader, the terminal reads a chip ID from a non-contact IC card or a mobile phone, and sends the chip ID to the service providing device. The service providing device sends a qualification authentication request including the chip ID to the authentication device. The authentication device authenticates the chip ID, and sends qualification authentication information indicating presence or absence of a customer's qualification to the service providing device. The service providing device operates the terminal according to the qualification authentication information.

SUMMARY

For example, an OS (abbreviation of Operation System) of a mobile terminal such as a smartphone may generate a random character string each time a non-contact wireless communication is performed and use the character string as a chip ID. In this case, since the chip ID is changed at each wireless communication, it is not suitable for authentication. Further, for example, the OS of the mobile terminal may use a predetermined character string as the chip ID. In this case, the chip ID is in common for a plurality of mobile terminals having the same OS and, since the chip ID does not guarantee the uniqueness of each mobile terminal, is not suitable for authentication.

The present disclosure provides a technique in which a communication device may appropriately execute an authentication of a target device by using identification information according to a type of a target device.

A communication device may comprise a wireless interface configured to perform a wireless communication according to a predetermined standard; a processor; and a memory storing computer-readable instructions therein, the computer-readable instructions, when executed by the processor, may cause the communication device to: receive a first signal including first identification information and attribute information from a target device via the wireless interface; determine which of a first type device or a second type device the target device is by using the attribute information; execute an authentication of the target device by using the first identification information in a case where it is determined that the target device is the first type device; and execute an authentication of the target device by using second identification information different from the first identification information in a case where it is determined that the target device is the second type device and a second signal including the second identification information is received from the target device via the wireless interface, the second signal being sent to the communication device from the second type device in accordance with a predetermined application software.

A control method, computer-readable instructions, and a non-transitory computer-readable recording medium in which the computer-readable instructions are stored for implementation of the communication device described above, are also novel and useful. Moreover, a communication system comprising the communication device described above and target device is also novel and useful.

BRIEF DESCRIPTION OF THE DRAWINGS

FIG. 3 shows a flowchart of processes at a time when the authentication flag is ON;
FIG. 7 shows a sequence diagram of a case of authenticating a mobile terminal corresponding to type A;
and
FIG. 8 shows a sequence diagram of a case of authenticating an authentication card and a mobile terminal corresponding to type F.

EMBODIMENTS (Configuration of Communication System 2; FIG. 1)

As shown in FIG. 1, a communication system 2 comprises a multi-function peripheral 10 (called "MFP (abbreviation of Multi-Function Peripheral)" below), an authentication card 50, and a mobile terminal 70. The devices 10, 50, 70 are capable of performing a wireless communication (called "NFC (abbreviation of Near Field Communication) communication" below) according to the NFC system.

(Configuration of MFP 10)

Figure 1:
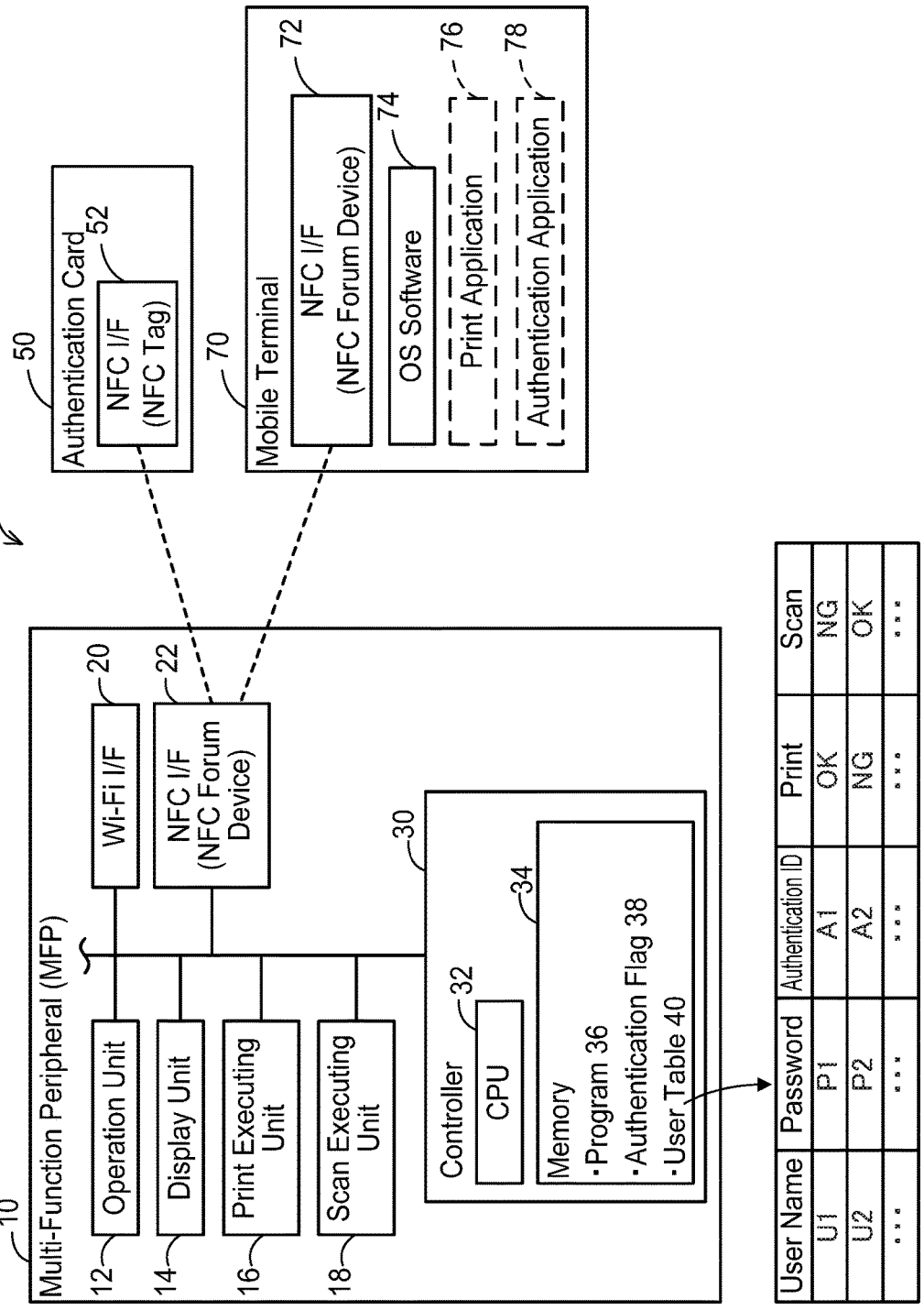
FIG. 1 shows configuration of a communication system.

The MFP 10 comprises an operation unit 12, a display unit 14, a print executing unit 16, a scan executing unit 18, a Wi-Fi interface (interface is described as "I/F" below) 20, an NFC I/F 22, and a controller 30.

The operation unit 12 comprises a plurality of keys. A user can input various instructions to the MFP 10 by operating the operation unit 12. The display unit 14 is a display for displaying various information. The display unit 14 also functions as a so-called touch panel. That is, the display unit 14 also functions as an operation unit. The print executing unit 16 comprises a printing mechanism such as ink jet scheme, laser scheme, etc. The scan executing unit 18 comprises a scanning mechanism such as CCD, CIS, etc.

The Wi-Fi I/F 20 is an I/F for performing a wireless communication (called "Wi-Fi communication" below) according to the Wi-Fi system. The Wi-Fi system is a wireless communication system based on, e.g., IEEE (abbreviation of The Institute of Electrical and Electronics Engineers, Inc.) standard 802.11 and standards conforming thereto (e.g., 802.11a, 11b, 11g, 11n, etc.). More specifically, the Wi-Fi I/F 20 supports the WFD (abbreviation of Wi-Fi Direct (registered trademark)) system developed by the Wi-Fi Alliance. The WFD system is a wireless communication system described in the standard document "Wi-Fi Peer-to-Peer (P2P) Technical Specification Version 1.1" created by the Wi-Fi Alliance.

The NFC I/F 22 is an I/F for performing an NFC communication. The NFC system is a wireless communication system based on e.g., international standards such as ISO/IEC14443, 15693, 18092, etc. Moreover, an I/F called an NFC forum device and an I/F called an NFC tag are known as types of I/F for performing an NFC communication. The NFC forum device is an I/F capable of selectively operating in any of P2P (abbreviation of Peer To Peer) mode, R/W (abbreviation of Reader/Writer) mode, and CE (abbreviation of Card Emulation) mode. The NFC tag is not an I/F capable of selectively operating in any of these modes, and functions as an IC (abbreviation of Integrated Circuit) tag of the NFC system.

P2P mode is a mode for performing bidirectional communication between one NFC apparatus operating in P2P mode and another NFC apparatus operating in P2P mode. R/W mode and CE mode are modes for performing unidirectional communication between one NFC apparatus operating in R/W mode and another NFC apparatus operating in CE mode. Moreover, CE mode includes normal CE mode requiring a secure element, and HCE (abbreviation of Host Card Emulation) mode not requiring a secure element. The Reader mode in the R/W mode is a mode for reading data from an NFC apparatus operating in CE mode. The Writer mode in the R/W mode is a mode for writing data to an NFC apparatus operating in CE mode. Moreover, an NFC apparatus operating in R/W mode can read data from an NFC tag, and write data to the NFC tag.

The NFC I/F 22 is an NFC forum device. The NFC I/F 22 sends e.g., a Polling signal and, in case of receiving a response signal to that signal from a partner apparatus, establishes an NFC communication link with the partner apparatus. Further, the NFC I/F 22 establishes an NFC communication link with the partner apparatus in case of, e.g., receiving a Polling signal from the partner apparatus, and sending a response signal to that signal to the partner apparatus.

Here, NFC communication will be described in detail. NFC communication is classified into four communication types (i.e., type A, type B, type F, and type V). The same frequency (i.e., 13.56 MHz) is used in each communication type. However, a combination of communication standard, modulation scheme, and coding scheme is different for each communication type. Type A is a communication conforming to communication standards "ISO/IEC14443 and 18092", modulation scheme "ASK (abbreviation of Amplitude Shift Keying) 100%", and coding scheme "Manchester". Type B is a communication conforming to communication standard "ISO/IEC14443", modulation scheme "ASK10%", and coding scheme "NRZ (abbreviation of Non Return to Zero)". Type F is a communication conforming to communication standard "ISO/IEC18092", modulation scheme "ASK10%", and coding scheme "Manchester". Type V is a communication conforming to communication standard "ISO/IEC15693", modulation scheme "ASK10% or 100%", and coding scheme "Manchester".

Next, differences between the Wi-Fi I/F 20 and the NFC I/F 22 will be described. A communication speed of a Wi-Fi communication via the Wi-Fi I/F 20 (e.g., maximum communication speed is 11 to 600 Mbps) is faster than a communication speed of an NFC communication via the NFC I/F 22 (e.g., maximum communication speed is 100 to 424 Kbps). Further, a frequency of a carrier wave upon a Wi-Fi communication via the Wi-Fi I/F 20 (e.g. a 2.4 GHz band or 5.0 GHz band) is different from a frequency of a carrier wave upon an NFC communication via the NFC I/F 22 (e.g. a 13.56 MHz band). Further, a maximum distance with which a Wi-Fi communication that can be performed via the Wi-Fi I/F 20 (e.g., about 100 m at maximum) is longer than a maximum distance with which an NFC communication that can be performed via the NFC I/F 22 (e.g., about 10 cm at maximum).

The controller 30 comprises a CPU 32 and a memory 34. The CPU 32 performs various processes in accordance with a program 36 stored in the memory 34. The memory 34 is configured by a volatile memory, non-volatile memory, etc. Further, the memory 34 stores an authentication flag 38 and a user table 40. The authentication flag 38 indicates either a value "ON" meaning performing authentication using user information, or a value "OFF" meaning not performing authentication. The authentication flag 38 is set to "ON" or "OFF" by an administrator of the MFP 10.

A user name, a password, an authentication ID, print allowing information, and scan allowing information are associated with each other in the user table 40. The user name, the password, the print allowing information, and the scan allowing information are registered in the user table 40 by, e.g., the administrator of the MFP 10 operating the operation unit 12, or accessing the MFP 10 from a terminal device. The print allowing information and the scan allowing information respectively indicate whether or not the user is allowed to perform the print function and scan function. "OK" in both types of the allowing information indicates that use of the function is allowed, and "NG" indicates that use of the function is not allowed. The authentication ID is identification information for identifying the authentication card 50 or the mobile terminal 70, and is extracted and registered from the authentication card 50 or the mobile terminal 70 by a process to be described later. Here, the term "identification information" including the authentication ID as an example may be information unique to one device, may be information identifying a component (e.g., software) in the device, or may be information indicating a model of the device. That is, the identification information is not restricted to information identifying one device itself, but also includes information identifying a certain concept. Moreover, in a modification, the user table 40 may be stored in a memory of an external device different from the MFP 10. In this case, the MFP 10 can communicate with the external device, and use the information in the user table 40.

(Configuration of Authentication Card 50)

The authentication card 50 comprises an NFC I/F 52 which is an NFC tag. The authentication card 50 usually does not have OS software or an application. The NFC I/F 52 corresponds to one type of the types A, B, F, and V (in other words, supports only one type). The NFC I/F 52 corresponding to type A is an I/F (i.e., card) conforming to communication standard "ISO/IEC14443" and is further classified into an I/F conforming to specific standard "ISO/IEC14443-4" conforming to communication standard "ISO/IEC14443", and an I/F not conforming to specific standard "ISO/IEC14443-4". The former I/F is a Mifare Desfire type card conforming to a specific communication protocol "T-CL" for non-contact cards, and includes e.g., Mifare ProX, Mifare SmartMX, Mifare Desfire, etc. Further, the latter I/F is a Mifare (registered trademark) type card not conforming to the communication protocol "T-CL", and includes e.g., Mifare Ultralight, Mifare Mini, etc. The NFC I/F 52 corresponding to type F is a card conforming to communication standard "ISO/IEC18092", and is e.g., a card such as FeliCa Standard, FeliCa Lite, etc. Further, the NFC I/F 52 corresponding to type V is a card conforming to communication standard "ISO/IEC15693".

(Configuration of Mobile Terminal 70)

The mobile terminal 70 is a portable terminal device such as a mobile telephone, a smartphone, a PDA, a notebook PC, a tablet PC, a portable music playback device or a mobile movie playback device. The mobile terminal 70 comprises an NFC I/F 72 and OS software 74. The NFC I/F 72 is an NFC forum device. The OS software 74 is software for controlling various basic operations of the mobile terminal

70. Further, although not shown, the mobile terminal 70 further comprises a Wi-Fi I/F for performing Wi-Fi communication.

The mobile terminal 70 may further comprise a print application 76 and an authentication application 78. The print application 76 is an application for causing the MFP 10 to perform a print function. The authentication application 78 is an application for causing the MFP 10 to perform authentication by using the mobile terminal 70. The applications 76, 78 are applications provided by a vendor of the MFP 10, and are installed on the mobile terminal 70 from, e.g., a server on the Internet.

Figure 2:
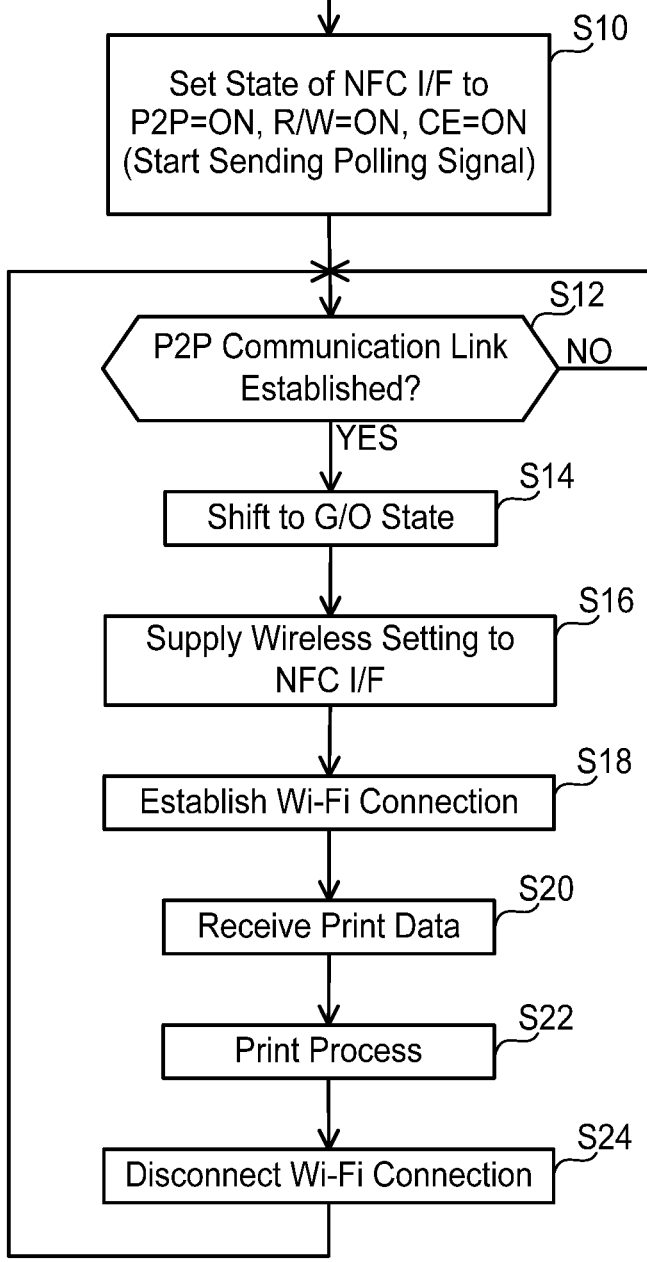
FIG. 2 shows a flowchart of processes at a time when an authentication flag is OFF.

(Process at Time when Authentication Flag is OFF; FIG. 2)

Next, processes performed by the CPU 32 in a case where the authentication flag 38 is set to "OFF" will be described with reference to FIG. 2. The process of FIG. 2 is started when the power of the MFP 10 is turned ON, or when an operation for changing the authentication flag 38 from "ON" to "OFF" is performed on the operation unit 12.

In S10, the CPU 32 sets mode state of the NFC I/F 22 to a mode state in which P2P mode, R/W mode, and CE mode are all ON. In this case, the NFC I/F 22 can operate in any of the above three modes. Moreover, in a modification, in S10, the CPU 32 may set the mode state to a mode where only P2P mode is ON, or may set the mode state to a mode where P2P mode is ON and R/W mode or CE mode is ON. That is, the CPU 32 may set the mode state to the mode where at least P2P mode is ON.

In S10, the CPU 32 further instructs the NFC I/F 22 to send four types of Polling signal corresponding to the types A, B, F, and V. As a result, the NFC I/F 22 repeatedly sends each Polling signal corresponding to each type in sequence.

In S12, the CPU 32 monitors whether a P2P communication link with the mobile terminal 70 has been established. The user brings the mobile terminal 70 comprising the NFC I/F 72 in which P2P mode is ON close to the MFP 10. In this case, the distance between the mobile terminal 70 and the MFP 10 becomes smaller than a maximum distance (e.g., 10 cm) with which NFC communication can be performed, and consequently a P2P communication link is established. In case of acquiring information from the NFC I/F 22 indicating that the P2P communication link has been established, the CPU 32 determines YES in S12, and proceeds to S14.

In S14, the CPU 32 shifts the operating state of the MFP 10 from device state of the WFD system to Group Owner state (called "G/O state" below) of the WFD system. Device state is a state in which of operating as neither a parent station nor child station of a wireless network conforming to the WFD system. G/O state is a state of operating as a parent station of the wireless network. Moreover, in a modification, instead of shifting to G/O state of the WFD system, the CPU 32 may activate a so-called Soft AP (abbreviation of Access Point), and operate as a parent station of the wireless network. In S14, the CPU 32 further determines wireless setting (i.e., SSID and password) to be used in the wireless network. The SSID is an identifier for identifying the wireless network. The password is a character string used for authentication and encryption in the wireless network. The CPU 32 determines the wireless setting by, e.g., acquiring a predetermined character string, or randomly extracting a character string.

In S16, the CPU 32 supplies the wireless setting determined in S14 to the NFC I/F 22. As a result, the NFC I/F 22 sends the wireless setting to the mobile terminal 70 via the P2P communication link. Due to this, in a case where the mobile terminal 70 receives the wireless setting and the mobile terminal 70 comprises the print application 76, the wireless setting is used in the mobile terminal 70. Then, various signals for establishing a Wi-Fi connection complying with the Wi-Fi scheme are sent from the mobile terminal 70 to the MFP 10.

In S18, the CPU 32 establishes the Wi-Fi connection with the mobile terminal 70 via the Wi-Fi I/F 20. Specifically, the CPU 32 receives a signal including the aforementioned SSID, a signal including the password, etc., and establishes the Wi-Fi connection when authentication of the password succeeds.

In S20, the CPU 32 receives print data representing an image of a print target from the mobile terminal 70 via the Wi-Fi I/F 20 by using the Wi-Fi connection established in S18. As described above, the communication speed of Wi-Fi communication is faster than the communication speed of NFC communication. Therefore, the MFP 10 can receive the print data from the mobile terminal 70 more quickly than in a configuration communicating the print data by using an NFC communication.

In S22, the CPU 32 supplies the print data received in S20 to the print executing unit 16, and causes the print executing unit 16 to perform a print. Moreover, in a modification, instead of S20 and S22, the CPU 32 may cause the scan executing unit 18 to scan a document, and send scan data to the mobile terminal 70 via the Wi-Fi I/F 20 by using the Wi-Fi connection. Thus, in a situation where the authentication flag 38 is set to "OFF", the MFP 10 performs the print function and the scan function when receiving an instruction from any user, without authenticating the user information (S20, S22).

In S24, the CPU 32 disconnects the Wi-Fi connection established in S18 and, further, shifts the operating state of the MFP 10 from G/O state to device state. When S24 ends, the process returns to S12.

Figure 3:
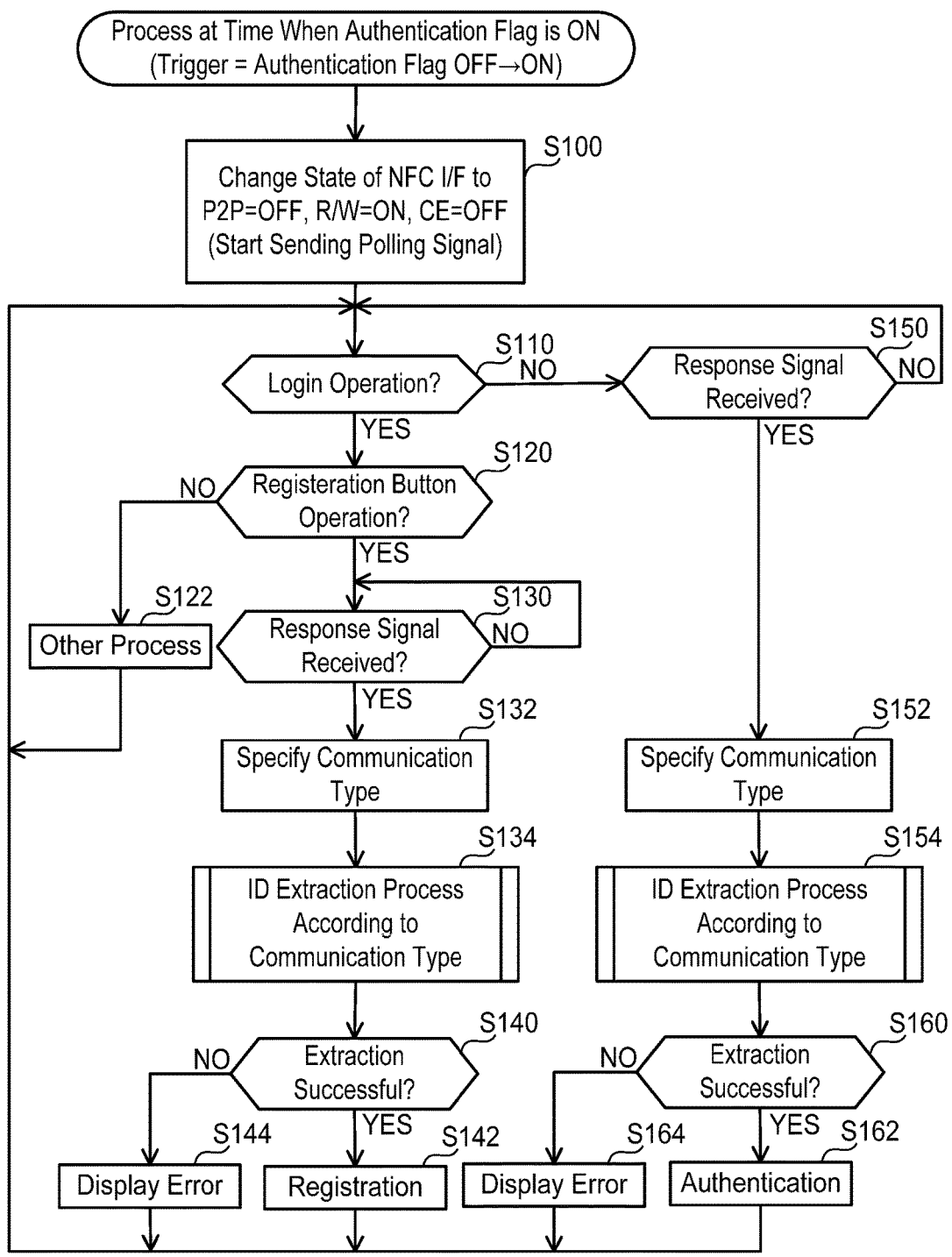

(Process at Time when Authentication Flag is ON; FIG. 3)

Next, processes performed by the CPU 32 in a case where the authentication flag 38 is set in "ON" will be described with reference to FIG. 3. When an operation for changing the authentication flag 38 from "OFF" to "ON" is performed on the operation unit 12, the processes of FIG. 3 are started. Moreover, below, the authentication card 50 and the mobile terminal 70 may be collectively called "target device".

In S100, the CPU 32 sets the mode state of the NFC I/F 22 to a state in which P2P mode and CE mode are OFF and R/W mode is ON. In this case, the NFC I/F 22 can operate only in R/W mode of the above three modes. In a situation where the authentication flag 38 is set in "ON", registration or authentication of the ID of the target device is performed. Here, in a case where the target device is the authentication card 50, the NFC I/F 22 must operate in R/W mode (more specifically, Reader mode) in order to receive the ID from the authentication card 50 (i.e., the NFC I/F 52 which is an NFC tag). Further, the mobile terminal 70 can send the ID by using an NFC communication according to the authentication application 78. Here, the authentication application 78 is programmed to send the ID in the state where the NFC I/F 72 is operating in CE mode. Therefore, even in a case where the target device is the mobile terminal 70, the NFC I/F 22 must operate in R/W mode (more specifically, Reader mode) in order to receive the ID from the mobile terminal 70 (i.e., the NFC I/F 72 which is an NFC forum device). Thus, since the NFC I/F 22 must operate in R/W mode in order to receive the ID from the target device, in S100, the NFC I/F 22 is set to a mode state capable of operating only in R/W mode.

In S100, the CPU 32 further instructs the NFC I/F 22 to send the four types of Polling signal corresponding to types A, B, F, and V. As a result, the NFC I/F 22 repeatedly sends each Polling signal corresponding to each type in sequence.

In S110, the CPU 32 monitors whether a login operation has been performed on the operation unit 12 by the user. In a case where the combination of a user name and a password registered in the user table 40 has been input to the operation unit 12, the CPU 32 determines YES in S110, and proceeds to S120.

In S120, the CPU 32 determines whether or not a registration button for registering the authentication ID in the user table 40 has been operated. In case of determining that the registration button has been operated (YES in S120), the CPU 32 proceeds to S130. On the other hand, in case of determining that a button different from the registration button has been operated (NO in S120), in S122 the CPU 32 performs a process corresponding to that different button. For example, in a case where a button for receiving print data from an external server and performing a print has been operated, the CPU 32 determines whether or not the print allowing information corresponding to the user information input in S110 (i.e., the user name and the password) is "OK". In case of determining "OK", the CPU 32 receives the print data, and supplies the print data to the print executing unit 16. Further, e.g., in a case where a button for performing a scan has been operated, the CPU 32 determines whether or not the scan allowing information corresponding to the user information input in S110 is "OK". In case of determining "OK", the CPU 32 causes the scan executing unit 18 to perform a scan. When S122 ends, the process returns to S110. Moreover, in a modification, the CPU 32 may accept an operation for performing the process of S122 even if the login operation is not performed again after S122 ends. This state may continue until a logout operation is performed by the user.

In S130, the CPU 32 monitors whether a response signal to the Polling signal has been received from the target device via the NFC I/F 22. As described above, the NFC I/F 22 repeatedly sends each Polling signal corresponding to each type in sequence. In case of receiving a response signal to this signal when, e.g., a Polling signal corresponding to type A has been sent, the NFC I/F 22 supplies information indicating type A to the controller 30. Similarly, in case of receiving a response signal corresponding to another communication type, the NFC I/F 22 supplies information indicating that type to the controller 30. In case of acquiring the aforementioned information from the NFC I/F 22, the CPU 32 determines YES in S130, and proceeds to S132.

In S132, based on the information acquired in S130, the CPU 32 specifies the communication type for receiving the response signal. Then, in S134, the CPU 32 performs an ID extraction process according to the specified communication type (see FIG. 4 and FIG. 5). Since the NFC I/F 22 is operating only in R/W mode, the CPU 32 can function as a Reader, and therefore can receive the signal from the target device, and read (i.e., extract) the ID in the signal.

As will be described in detail later, various signals are received from the target device in response to the Polling signals. Signals in which only a relatively lower layer among the NFC standard communication layers is used (e.g., SDD signal, SENSF signal, etc., to be described) include IDs corresponding to the communication types. The IDs corresponding to the communication types A, B, F, V are "NFCID1", "NFCID0", "NFCID2", and "UID (abbreviation of Universal ID)", respectively. NFCID0 to NFCID2 are defined by the NFC forum, and UID is not defined by the NFC forum. Further, in the case where the target device is the mobile terminal 70, after a signal including each of the aforementioned IDs corresponding to the communication type has been received, a signal used by a relatively upper layer among the NFC standard communication layers (e.g., an NDEF signal, to be described) is received, and that signal may include an ID. In a case where an ID suitable for authentication is received, in S134, the CPU 32 extracts the ID from the target device.

In S140, the CPU 32 determines whether or not the ID has been successfully extracted. In a case where the ID has been successfully extracted (e.g., see "Normal END" of FIG. 4 and FIG. 5), the CPU 32 determines YES in S140, and in S142, registers the ID extracted in S134 in the user table 40 as the authentication ID corresponding to the user information input in S110. In a case where an authentication ID corresponding to the user information input in S110 has already been registered, in S142, the CPU 32 overwrites and registers the ID of the target device as the authentication ID corresponding to the user information. Moreover, in a modification, in a case where the authentication ID corresponding to the user information input in S110 has already been registered, the CPU 32 may newly register, in the user table 40, new information in which the user information and the ID of the target device are associated with one another. That is, in this case, a plurality of authentication IDs is registered for one piece of user information.

On the other hand, in a case where extraction of the ID has failed (e.g., see "Error END" of FIG. 4 and FIG. 5), the CPU 32 determines NO in S140 and, in S144, causes the display unit 14 to display an error screen indicating that the registration of the authentication ID is impossible to be executed. Due to this, the user can know that the registration of the authentication ID has failed. When S142 or S144 ends, the CPU 32 returns to S110.

Further, in S150, the CPU 32 monitors whether a response signal to the Polling signal is received from the target device via the NFC I/F 22. S150 is the same as S130. Further, S152, S154, and S160, which are performed in the case of YES in S150, are the same as S132, S134, and S140.

In S162, the CPU 32 authenticates the ID extracted in S154, i.e., authenticates the target device. The CPU 32 determines that the authentication has succeeded in a case where an authentication ID matching the extracted ID is registered in the user table 40. In this case, the CPU 32 performs the function allowed for the user in accordance with the instruction from the user, in the same manner as the process described in S122. Here, the CPU 32 may, e.g., cause the display unit 14 to display a screen indicating a list of functions allowed for the user, and accept an instruction for selecting a function from that list. By causing the MFP 10 to authenticate the target device, the user can cause the MFP 10 to perform the function even without performing the login operation. Moreover, in a case where an authentication ID matching the ID of the target device is not registered in the user table 40, the CPU 32 determines that authentication has failed, and may, for example, cause the display unit 14 to display an error screen, and return to S110. Moreover, in a modification, the CPU 32 may accept an operation for performing a process according to an instruction from the user even if authentication has not been performed again after S162 ends. This state may continue until a logout operation is performed by the user.

On the other hand, in a case where extraction of the ID failed, the CPU 32 determines NO in S160 and, in S164, causes the display unit 14 to display an error screen indicating that authentication of the ID (i.e., authentication of the target device) is impossible to be executed. Due to this, the user can know that authentication has failed. In this case, the CPU 32 does not perform the print function and scan function. When S162 or S164 ends, the process returns to S110. Moreover, in a modification, instead of displaying the error screen (i.e., S144 and S164), a sound indicating error may be output, or an image indicating error may be printed.

Figure 4:
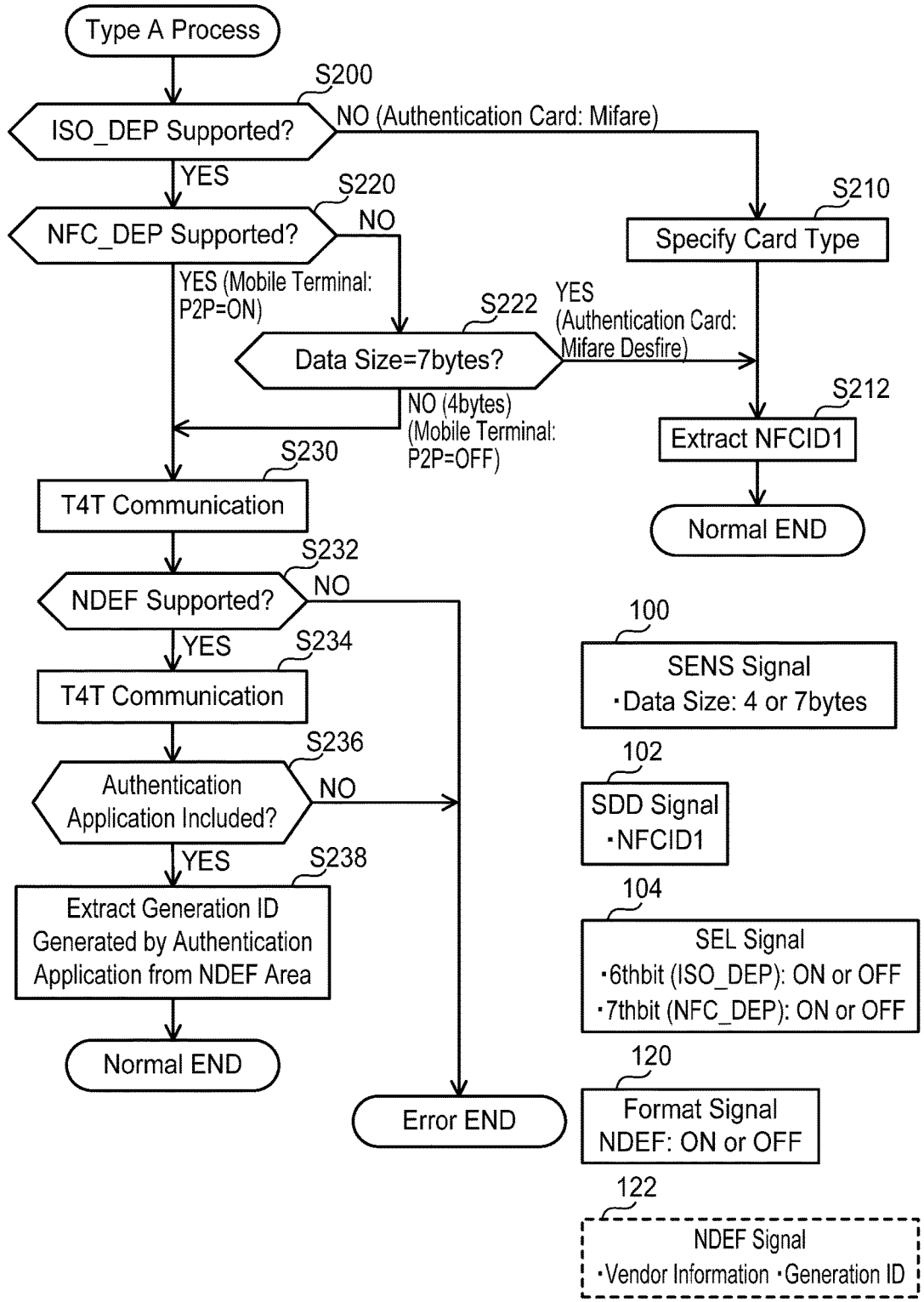
FIG. 4 shows a flowchart of an ID extraction process corresponding to type A.

(ID Extraction Process Corresponding to Type A; FIG. 4)

Next, contents of processes executed in S134 or S154 of FIG. 3 will be described with reference to FIG. 4 and FIG. 5. First, the process in the case where type A is specified in S132 or S152 will be described with reference to FIG. 4.

In a case where the target device corresponds to type A, i.e., in a case where the target device has sent a response signal to the Polling signal of type A, the response signal includes an SENS signal (abbreviation of SENS_RES Response) 100 including information indicating the data size of the NFCID1. Thereafter, in response to sending the request signal to the target device, the CPU 32 sequentially receives, from the target device, an SDD signal (abbreviation of SDD_RES Response) 102 including the NFCID1, and an SEL signal (abbreviation of SEL_RES Response) 104. The signals 100, 104 are signals including attribute information (e.g., data size, ISO_DEP, NFC_DEP, (to be described), etc.) indicating attributes of the target device (i.e., the NFC I/F 52 or 72). Moreover, the names of the signals 100 to 104 are defined by the NFC forum.

Communication layers of the NFC communication include an analog layer which is a lowest layer, a digital protocol layer which is an upper layer of the analog layer, an activity layer which is an upper layer of the digital protocol layer, and T1T to T5T layers which are upper layers of the activity layer. The SENS signal 100, the SDD signal 102, and the SEL signal 104 are communicated by using the communication layers of the activity layer or lower without using the communication layers of the T1T to T5T layer or higher.

The information indicating the data size of the NFCID1 included in the SENS signal 100 indicates 4 bytes or 7 bytes. Specifically, the NFCID1 prepared by the OS software 74 is usually 4 bytes. Further, the NFCID1 assigned to the Mifare Desfire type authentication card is usually 7 bytes.

For example, in the case where the target device is the authentication card 50, the NFCID1 is pre-assigned to the authentication card 50. In this case, the NFCID1 is a unique ID for each authentication card, and the NFCID1 does not overlap between two or more authentication cards. Further, e.g., in the case where the target device is the mobile terminal 70, the NFCID1 is prepared by the OS software 74. For example, when the SDD signal 102 is to be sent, the OS software 74 randomly determines a character string, and determines the character string as the NFCID1. Therefore, if the NFCID1 received from the mobile terminal 70 is registered in the user table 40 (S142 of FIG. 3), the NFCID1 received from the mobile terminal 70 thereafter is usually different from the registered NFCID1. Therefore, the NFCID1 received from the mobile terminal 70 is not suitable for authentication, and should not be registered in the user table 40.

The sixth bit in the SEL signal 104 indicates whether or not the target device supports ISO_DEP (abbreviation of Data Exchange Protocol defined in ISO/IEC14443-4). "ISO_DEP supported" means that the target device is compatible with ISO/IEC14443-4. In a case where the sixth bit indicates "ON", the target device supports ISO_DEP, and in a case where the sixth bit indicates "OFF", the target device does not support ISO_DEP. The target device supporting ISO_DEP means that the target device is the mobile terminal 70 or the Mifare Desfire type authentication card 50. Further, the target device not supporting ISO_DEP means that the target device is the Mifare type authentication card 50.

Further, the seventh bit in the SEL signal 104 indicates whether or not the target device supports NFC_DEP (abbreviation of Data Exchange Protocol defined in ISO/IEC18092). Supporting NFC_DEP means that the target device is able to establish the P2P communication link, i.e., that the target device is capable of performing bidirectional communication. In a case where the seventh bit indicates "ON", the target device supports NFC_DEP, and in a case where the seventh bit indicates "OFF", the target device does not support NFC_DEP. The target device supporting NFC_DEP means that the target device is the mobile terminal 70. Further, the target device not supporting NFC_DEP means that the target device is the Mifare type or Mifare Desfire type authentication card 50. Moreover, the SEL signal (i.e., SEL_RES Response) can also be called SAK (abbreviation of Select Acknowledge).

In S200, the CPU 32 determines whether or not the target device supports ISO_DEP based on the value of the sixth bit in the SEL signal 104. In a case where the sixth bit indicates "ON", the CPU 32 determines that the target device supports ISO_DEP (YES in S200), and proceeds to S220. On the other hand, in a case where the sixth bit indicates "OFF", the CPU 32 determines that the target device does not support ISO_DEP (NO in S200), and proceeds to S210. In this case, the CPU 32 determines that the target device is the Mifare type authentication card 50.

In S210, the CPU 32 specifies the card type of the Mifare type authentication card 50. If the card type is different, the data size of the NFCID1 may be different. For this reason, the CPU 32 specifies the card type of the authentication card 50 based on information (not shown) in the SEL signal 104 indicating the card type. For example, the CPU 32 specifies one card type from among a plurality of card types such as Mifare Ultralight, Mifare Mini, etc.

Next, in S212, based on the card type specified in S210, the CPU 32 specifies the data size of the NFCID1, and extracts the NFCID1 having the specified data size from the character string in the SDD signal 102. When S212 ends, the CPU 32 ends the process of FIG. 4 as Normal END. As a result, YES is determined in S140 or S160 of FIG. 3, and the extracted NFCID1 is used in S142 or S162. Moreover, in a modification, instead of S210, the CPU 32 may specify the data size of the NFCID1 based on data size information in the SENS signal 100.

In S220, the CPU 32 determines whether or not the target device supports NFC_DEP based on the value of the seventh bit in the SEL signal 104. In a case where the seventh bit indicates "ON", the CPU 32 determines that the target device supports NFC_DEP (YES in S220), and proceeds to S230. In this case, the CPU 32 determines that the target device is the mobile terminal 70 that is able to establish a P2P communication link. On the other hand, in a case where the seventh bit indicates "OFF", the CPU 32 determines that the target device does not support NFC_DEP (NO in S220), and proceeds to S222. In this case, the CPU 32 determines that the target device is the mobile terminal 70 that is unable to establish a P2P communication link, or the Mifare Desfire type authentication card 50. Moreover, the mobile terminal 70 usually has the capability to establish a P2P communication link, and is actually able to establish a P2P communication link. However, despite being able to establish a P2P communication link, some types of mobile terminal 70 may send, to the MFP 10, the SEL signal 104 including information indicating that NFC_DEP is not supported. In a case where the SEL signal 104 is received from this kind of mobile terminal 70, the CPU 32 determines NO in S220.

In S222, the CPU 32 determines whether or not the data size information in the SENS signal 100 indicates 7 bytes. In a case where the data size information indicates 7 bytes, the CPU 32 determines YES in S222, and proceeds to S212. In this case, the CPU 32 determines that the target device is the Mifare Desfire type authentication card 50 and, in S212, extracts the NFCID1 having 7 bytes from the character string in the SDD signal 102. On the other hand, in a case where the data size information indicates 4 bytes, the CPU 32 determines NO in S222, and proceeds to S230. In this case, the CPU 32 determines that the target device is the mobile terminal 70. Moreover, the data size by which the target device is determined to be the Mifare Desfire type authentication card 50 (7 bytes in the present embodiment) is set based on the data size described in the Mifare specifications.

In S230, the CPU 32 performs a communication using the T4T layer (called "T4T communication" below) with the mobile terminal 70 that is the target device via the NFC I/F 22. In the T4T communication, the CPU 32 sends a request signal to the mobile terminal 70, and receives a response signal from the mobile terminal 70. The response signal includes a Format signal 120 that includes Format information. The Format information indicates whether or not the mobile terminal 70 supports NDEF (abbreviation of NFC Data Exchange Format). In a case of supporting NDEF, the mobile terminal 70 is able to perform communication of an NDEF signal 122 that includes an NDEF area and, in a case of not supporting NDEF, the mobile terminal 70 is unable to perform communication of the NDEF signal 122. The NDEF area is an area in which the mobile terminal 70 can freely describe information. As will be described later, e.g., ID generated by the authentication application 78 (called "generation ID" below) is described in the NDEF area.

The generation ID is generated at a first activation of the authentication application 78. The authentication application 78 generates a generation ID having a predetermined number of bytes (e.g., 32 bytes) from a MAC address of the mobile terminal 70. Since the generation ID is generated from the unique MAC address which is not duplicated between two or more mobile terminals, the generation ID is a unique ID. Further, the generation ID that was generated at the first activation of the authentication application 78 (i.e., a fixed ID) is used continuously in the same mobile terminal 70. The authentication application 78 describes vendor information indicating a vendor of the authentication application 78 (i.e., vendor of the MFP 10) and the generation ID in the NDEF area. Moreover, in a modification, a unique ID which is not duplicated between two or more authentication applications may be pre-assigned to the authentication application 78. In this case, the authentication application 78 may describe the unique ID in the NDEF area. Further, in another modification, the authentication application 78 may supply the generation ID or a pre-assigned ID to the OS software 74, and the OS software 74 may describe the ID in the NDEF area. That is, the NDEF signal 122 including the ID may be any signal sent according to the authentication application 78.

In S232, the CPU 32 determines whether or not the mobile terminal 70 supports NDEF based on the Format information included in the Format signal 120. In a case of determining that the mobile terminal 70 supports NDEF (YES in S232), the CPU 32 proceeds to S234. On the other hand, in a case of determining that the mobile terminal 70 does not support NDEF (NO in S232), since a communication cannot be performed of the NDEF signal 122 that includes the NDEF area in which the authentication application 78 can describe the ID, the CPU 32 ends the process of FIG. 4 as Error END without performing further communication. As a result, NO is determined in S140 or S160 of FIG. 3.

In S234, the CPU 32 performs further T4T communication with the mobile terminal 70 via the NFC I/F 22. In the T4T communication, the CPU 32 sends a request signal to the mobile terminal 70, and receives a response signal from the mobile terminal 70. The response signal includes the NDEF signal 122 that includes the NDEF area.

In S236, the CPU 32 determines whether the mobile terminal 70 does or does not comprise the authentication application 78 based on the described contents in the NDEF area included in the NDEF signal 122. Specifically, in a case where the vendor information indicating the vendor is described in the NDEF area, the CPU 32 determines that the mobile terminal 70 comprises the authentication application 78 (YES in S236), and proceeds to S238. On the other hand, in a case where the vendor information indicating the vendor is not described in the NDEF area, the CPU 32 determines that the mobile terminal 70 does not comprise the authentication application 78 (NO in S236), and ends the process of FIG. 4 as Error END. This is because the generation ID is not described in the NDEF area, since the mobile terminal 70 does not comprise the authentication application 78. Moreover, in a case where YES is determined in S232 and NO is determined in S236, this means that the mobile terminal 70 has some application that uses NDEF but the application is not the authentication application 78.

In S238, the CPU 32 extracts the generation ID in the NDEF area. In this case, the CPU 32 ends the process of FIG. 4 as Normal END. As a result, YES is determined in S140 or S160 of FIG. 3, and the extracted generation ID is used in S142 or S162.

(ID Extraction Process Corresponding to Type B; FIG. 4)

Next, processes in the case where type B is specified in S132 or S152 of FIG. 3 will be described. Since there are many processes in common for type A and type B, the ID extraction process corresponding to type B will be described with reference to FIG. 4. The same NFCID0 may possibly be assigned to a plurality of authentication cards corresponding to type B. For this reason, the NFCID0 of the authentication card 50 is not suitable for authentication. Therefore, in the present embodiment, in a case where the target device is the authentication card 50 corresponding to type B, registration and authentication of the ID is not performed.

The CPU 32 skips S200 to S222 of FIG. 4, and performs the processes of S230 to S238. In the case where the target device is the authentication card 50, since the vendor information is not described in the NDEF area, the CPU 32 can determine that the target device is the authentication card 50 in the case where NO is determined in S236. In this case, the CPU 32 ends the process of FIG. 4 as Error END.

On the other hand, in the case where the target device is the mobile terminal 70, the CPU 32 performs the processes of S230 to S238, and extracts the generation ID and ends the process as Normal END, or fails to extract the ID and ends the process as Error END.

(ID Extraction Process Corresponding to Type F; FIG. 5)

Next, processes in the case where type F is specified in S132 or S152 of FIG. 3 will be described with reference to FIG. 5. In a case where the target device corresponds to type F, i.e., in a case where the target device has sent a response signal to the Polling signal of type F, the response signal includes an SENSF signal (abbreviation of SENSF_RES Response) 140 defined by the NFC forum. The SENSF signal 140 is communicated by using the communication layer of the activity layer or lower without using a communication layer of the T3T (abbreviation of Type 3 Tag) layer or higher. The SENSF signal 140 includes PADO and NFCID2.

The PADO is attribute information indicating attributes of the target device (i.e., NFC I/F), and includes information indicating the IC type of the NFC I/F. Moreover, the PADO can also be called PMm (abbreviation of Manufacture Parameter). In the case where the target device is the mobile terminal 70, the PADO indicates any IC type of 06h, 07h, 10h to 13h, and 14h to 1Fh (collectively referred to as "predetermined type" below). Further, in the case where the target device is the authentication card 50, the PADO indicates any IC type of 01h, 08h, 09h, 0Dh, 20h, and 32h. Moreover, the PADO is 2-byte information, and the information (06h, etc.) indicating the IC type described in the present disclosure and drawings indicates a part of the information included in the PADO.

The NFCID2 is the same as the NFCID1 with an exception that the data size is 8 bytes, and can also be called an IDm (Manufacture ID) for identifying the target device. That is, in the case where the target device is the authentication card 50, the unique NFCID2 is pre-assigned to the authentication card 50. Further, in the case where the target device is the mobile terminal 70, the NFCID2 is prepared by the OS software 74. That is, the NFCID2 received from the mobile terminal 70 is not suitable for authentication.

In S300, the CPU 32 determines whether or not the IC type of the NFC I/F of the target device is the predetermined type based on the PADO included in the SENSF signal 140. In a case where the PADO indicates the predetermined type, the CPU 32 determines YES in S300, and proceeds to S330. In this case, the CPU 32 determines that the target device is the mobile terminal 70. On the other hand, in a case where the PADO does not indicate the predetermined type, the CPU 32 determines NO in S300, and proceeds to S312. In this case, the CPU 32 determines that the target device is the authentication card 50 such as FeliCa Standard, FeliCa Lite, etc.

In S312, the CPU 32 extracts the NFCID2 included in the SENSF signal 140. When S312 ends, the CPU 32 ends the process of FIG. 5 as Normal END. As a result, YES is determined in S140 or S160 of FIG. 3, and the extracted NFCID2 is used in S142 or S162.

In S330, the CPU 32 performs a communication using the T3T layer (called "T3T communication" below) with the mobile terminal 70 that is the target device via the NFC I/F 22.

In the T3T communication, the CPU 32 sends a request signal to the mobile terminal 70, and receives a Format signal 160 from the mobile terminal 70. The Format signal 160 is the same as the Format signal 120 of FIG. 4. Subsequent steps S332 to S338 are the same as S232 to S238 of FIG. 4, and an NDEF signal 162 received in S334 is the same as the NDEF signal 122 of FIG. 4. The CPU 32 performs the processes of S330 to S338, extracts the generation ID and ends the process as normal END, or fails to extract the ID and ends the process as error END.

(ID Extraction Process Corresponding to Type V)

Next, although not shown, processes in the case where type V is specified in S132 or S152 of FIG. 3 will be described. In a case where the target device corresponds to type V, the target device cannot be the mobile terminal 70, but is the authentication card 50. Therefore, in the case where type V is specified, the CPU 32 extracts a UID included in the response signal to the Polling signal. In this case, YES is inevitably determined in S140 or S160. Moreover, the data size of the UID corresponding to type V is 8 bytes.

(Specific Cases)

Next, specific cases A to F realized by the processes of FIG. 3 to FIG. 5 will be described with reference to FIG. 6 to FIG. 8. In an initial state of each of the cases A to F, the authentication flag 38 is set in "ON", and as a result only the R/W mode is ON in the NFC I/F 22 (S100 of FIG. 3).

In T10, the MFP 10 repeatedly sends the four types of Polling signal corresponding to the four types in sequence (S100 of FIG. 3).

(Case A; FIG. 6)

In case A, the target device is a Mifare type authentication card 50A of which communication type corresponds to type A. The NFCID1 "A3" is pre-assigned to the authentication card 50A.

In T20, the MFP 10 accepts input of the user information including the combination of a user name "U3" and a password "P3" (i.e., accepts a login operation) (S110 of FIG. 3) and, in T22, accepts operation of the registration button (YES in S120).

Thereafter, when the user brings the authentication card 50A close to the MFP 10, in T30, in response to the sending of the Polling signal of type A, the MFP 10 sequentially receives respective response signals of type A including an SENS signal, an SDD signal including the NFCID1 "A3", and an SEL signal from the authentication card 50A (YES in S130). In this case, the MFP 10 specifies type A (S132).

Since the sixth bit in the SEL signal indicates OFF, the MFP 10 determines that the target device does not support ISO_DEP (NO in S200 of FIG. 4), and determines that the target device is the Mifare type authentication card 50A. Further, the MFP 10 specifies the card type of the authentication card 50A based on the information indicating the card type in the SEL signal (S210). In T40, the MFP 10 extracts, from the SDD signal, the NFCID1 "A3" having a data size corresponding to the specified card type (S212). In T42, the MFP 10 registers the NFCID1 "A3" in the user table 40 as the authentication ID in association with the user information (S142 of FIG. 3). Moreover, when T42 is completed, the MFP 10 logs off the user who logged in at T20.

When the user again brings the authentication card 50A close to the MFP 10 after the registration of the authentication ID of the authentication card 50A in the user table 40 has been completed in T42, in T50, the MFP 10 receives respective response signals of type A in the same manner as T30 (YES in S150). In this case, the MFP 10 specifies type A (S152). The subsequent T60 is the same as T40.

In T62, the MFP 10 authenticates the authentication card 50A (S162). Since the authentication ID "A3" matching the NFCID1 "A3" extracted in T60 is registered in the user table 40, the MFP 10 determines that authentication succeeded. In this case, the MFP 10 performs the function allowed for the user corresponding to the user name "U3".

(Case B; FIG. 6)

In case B, the target device is a Mifare Desfire type authentication card 50B of which communication type corresponds to type A. An NFCID1 "A4" is pre-assigned to the authentication card 50B.

In T130, in response to the sending of the Polling signal of type A, the MFP 10 sequentially receives respective response signals of type A including an SENS signal, an SDD signal including the NFCID1 "A4", and an SEL signal from the authentication card 50B (YES in S150). In this case, the MFP 10 specifies type A (S152).

Since the sixth bit in the SEL signal indicates ON, the MFP 10 determines that the target device supports ISO_DEP (YES in S200 of FIG. 4) and, since the seventh bit in the SEL signal indicates OFF, the MFP 10 determines that the target device does not support NFC_DEP (NO in S220). Since the data size information in the SENS signal indicates 7 bytes (YES in S222), the MFP 10 determines that the target device is the Mifare Desfire type authentication card 50B. As a result, in T140, the MFP 10 extracts the NFCID1 "A4" from the SDD signal (S212) and, in T142, the MFP 10 performs authentication using the NFCID1 "A4" (S162 of FIG. 3).

(Case C; FIG. 7)

In case C of FIG. 7, the target device is a mobile terminal 70A of which communication type corresponds to type A, and is the mobile terminal 70A capable of performing P2P communication. A generation ID "A5" generated at the first activation of the authentication application 78 is assigned to the mobile terminal 70A.

When the user brings the mobile terminal 70A close to the MFP 10 and the mobile terminal 70A receives a Polling signal from the MFP 10, in T228, the OS software 74 of the mobile terminal 70A randomly generates a character string, and determines the character string as an NFCID1 "A6".

In T230, in response to the sending of the Polling signal of type A, the MFP 10 receives respective response signals of type A including an SENS signal, an SDD signal including the NFCID1 "A6", and an SEL signal from the mobile terminal 70A (YES in S150). In this case, the MFP 10 specifies type A (S152).

Since the sixth bit in the SEL signal indicates ON, the MFP 10 determines that the target device supports ISO_DEP (YES in S200 of FIG. 4) and, since the seventh bit in the SEL signal indicates ON, the MFP 10 determines that the target device supports NFC_DEP (YES in S220). Due to this, the MFP 10 determines that the target device is the mobile terminal 70A capable of performing P2P communication.

In T232, the MFP 10 receives, from the mobile terminal 70A, T4T respective response signals including a Format signal including the Format information and an NDEF signal including the NDEF area. Specifically, the MFP 10 first receives the Format signal (S230) and, since the Format information indicates that the mobile terminal 70A supports NDEF (YES in S232), the MFP 10 further receives the NDEF signal (S234). Since the vendor information is included in the NDEF area (YES in S236), in T240, the MFP 10 extracts the generation ID "A5" from the NDEF area (S238) and, in T242, the MFP 10 performs authentication using the generation ID "A5" (S162 of FIG. 3).

(Case D; FIG. 7)

In case D, the target device is a mobile terminal 70B of which communication type corresponds to type A and, despite being actually able to perform P2P communication, is the mobile terminal 70B in which OFF is described in the seventh bit in the SEL signal. A generation ID "A7" generated at the first activation of the authentication application 78 is assigned to the mobile terminal 70B.

In T248, the OS software 74 of the mobile terminal 70B randomly generates a character string, and determines the character string as an NFCID1 "A8".

In T250, in response to the sending of the Polling signal of type A, the MFP 10 sequentially receives, from the mobile terminal 70B, respective response signals of type A including an SENS signal, an SDD signal including the NFCID1 "A8", and an SEL signal (YES in S150). In this case, the MFP 10 specifies type A (S152).

Since the sixth bit in the SEL signal indicates ON, the MFP 10 determines that the target device supports ISO_DEP (YES in S200 of FIG. 4) and, since the seventh bit in the SEL signal indicates OFF, the MFP 10 determines that the target device does not support NFC_DEP (NO in S220). Since the data size information in the SENS signal indicates 4 bytes (NO in S222), the MFP 10 determines that the target device is the mobile terminal 70B that is not capable of performing P2P communication. The subsequent steps S252 to S262 are the same as T232 to T242 of case C.

(Case E; FIG. 8)

In case E, the target device is an authentication card 50C of which communication type corresponds to type F, such as FeliCa Standard, FeliCa Lite, etc. An NFCID2 "A9" is pre-assigned to the authentication card 50C.

In T330, in response to the sending of the Polling signal of type F, the MFP 10 receives a response signal of type F including an SENSF signal from the authentication card 50C (YES in S150). The SENSF signal includes the PADO indicating IC type "01h", and the NFCID2 "A9". In this case, the MFP 10 specifies type F (S152).

Since the IC type "01h" indicated by the PADO does not indicate the predetermined type (NO in S300 of FIG. 5), the MFP 10 determines that the target device is the authentication card 50C such as FeliCa Standard, FeliCa Lite, etc. As a result, in T340, the MFP 10 extracts the NFCID2 "A9" from the SENSF signal (S312) and, in T342, performs authentication using the NFCID2 "A9" (S162 of FIG. 3).

(Case F; FIG. 8)

In case F, the target device is a mobile terminal 70C of which communication type corresponds to type F. A generation ID "A10" generated at the first activation of the authentication application 78 is assigned to the mobile terminal 70C.

In T348, the OS software 74 of the mobile terminal 70C randomly generates a character string, and determines the character string as an NFCID2 "A11".

In T350, in response to the sending of the Polling signal of type F, the MFP 10 receives a response signal of type F including an SENSF signal from the mobile terminal 70C (YES in S150). The SENSF signal includes the PADO indicating an IC type "06h", and the NFCID2 "A11". In this case, the MFP 10 specifies type F (S152).

Since the IC type "06h" indicated by the PADO indicates the predetermined type (YES in S300 of FIG. 5), the MFP 10 determines that the target device is the mobile terminal 70C. Subsequent steps T352 to T362 are the same as T232 to T242 of case C of FIG. 7.

(Effect of Present Embodiment)

As described above, the NFCID1, the NFCID2, and the UID of the authentication card 50 are fixed IDs and, further, since their uniqueness is guaranteed, they are suitable for authentication. On the other hand, since the NFCID1 or the NFCID2 prepared by the OS software 74 of the mobile terminal 70 are determined each time an NFC communication is performed, these are not fixed IDs, and are not suitable for authentication. Further, there may be, in the OS software 74, a specific OS software that uses a predetermined fixed ID as the NFCID1 or the NFCID2. Such specific OS software uses a fixed ID, but the same ID is used as the NFCID1 or the NFCID2 for and among a plurality of mobile terminals having that specific OS software. Since such an ID does not guarantee uniqueness, it is not suitable for authentication. In this regard, in the present embodiment, the MFP 10 changes the ID to be used for authentication depending on whether the target device is the authentication card 50 or the mobile terminal 70. That is, the MFP 10 determines whether the target device is the authentication card 50 or the mobile terminal 70 by using the respective pieces of information included in the SENS signal and SEL signal of FIG. 4, or by using the PADO included in the SENSF signal of FIG. 5 (S200, S220, S222 of FIG. 4, S300 of FIG. 5). In case of determining that the target device is the authentication card 50, the MFP 10 performs authentication using the NFCID1 or the NFCID2 (S212 of FIG. 4, S312 of FIG. 5, S162 of FIG. 3) and, in case of determining that the target device is the mobile terminal 70, the MFP 10 performs authentication using the generation ID in the NDEF area received by the T4T communication (S238 of FIG. 4, S338 of FIG. 5, S162 of FIG. 3). Here, the generation ID is a fixed and unique ID generated by the authentication application 78 of the mobile terminal 70. Therefore, in the case where the target device is the mobile terminal 70, the MFP 10 can appropriately perform authentication using the generation ID without using the NFCID1 or the NFCID2 that are not suitable for authentication.

Further, in the present embodiment, the MFP 10 can appropriately extract the ID for the target device corresponding to any of type A, B, F, and V. In particular, for type A, the MFP 10 determines the target device based on the respective pieces of information included in the SENS signal and SEL signal (S200, S220, S222 of FIG. 4) and, for type F, the MFP 10 determines the target device based on the PADO included in the SENSF signal (S300 of FIG. 5). Thus, since the attribute information to be used for determining the target device is changed according to type, the MFP 10 can appropriately determine of what kind the target device is.

Moreover, e.g., a terminal of a convenience store, a ticket gate machine of a station, a drink vending machine, etc. can authenticate both electronic money of an authentication card and electronic money of a mobile terminal. This type of known device does not use the NFCID1 or the NFCID2 as the authentication ID and, further, uses an ID which is described in a predetermined signal received by T3T communication, T4T communication, etc. as the authentication ID without distinguishing between authentication card and mobile terminal. This type of ID is described in the predetermined signal according to a predetermined rule. However, when such a configuration is adopted, communication of the T1T to T5T layers is always needed. By contrast, in the present embodiment, in the case where the target device is the authentication card 50, since the MFP 10 performs authentication using the NFCID1 or the NFCID2 of the authentication card 50, communication of the T1T to T5T layers does not need to be performed (NO in S200 of FIG. 4, YES in S222, or NO in S300 of FIG. 5). Consequently, in the case where the target device is the authentication card 50, the MFP 10 can quickly perform authentication of the authentication card 50.

(Correspondence Relationship)

The MFP 10, the authentication card 50, and the mobile terminal 70 are an example of "communication device", "first type device", and "second type device", respectively. The NFC I/F 22 is an example of "wireless interface". S144, S164 of FIG. 3 is an example of "output impossible information". The authentication application 78 is an example of "predetermined application". In FIG. 4, the SENS signal 100, the SDD signal 102, and the SEL signal 104 are examples of "first signal", and the Format signal 120 and the NDEF signal 122 are examples of "second signal". Further, in FIG. 5, the SENSF signal 140 is an example of "first signal", and the Format signal 160 and the NDEF signal 162 are examples of "second signal". In FIG. 6 to FIG. 8, the response signal of type A or type F is an example of "first signal". In FIG. 7, FIG. 8, the T4T or T3T response signal is an example of "second signal". Type F and type A are an example of "first communication type" and "second communication type", respectively. The activity layer is an example of "first communication layer", and the T1T to T5T layers are examples of "second communication layer".

The NFCID1, the NFCID2, and the UID are an example of "first identification information", and the generation ID is an example of "second identification information". The SENS signal 100, the SEL signal 104, and the information in the SENSF signal 140 are examples of "attribute information". The information indicating a data size in the SENS signal 100, and the sixth bit and seventh bit in the SEL signal 104 are an example of "first information", "second information" and "third information", respectively. 7 bytes and 4 bytes are an example of "first data size" and "second data size", respectively. The PADO, the Format information, and the vendor information are an example of "fourth information", "fifth information" and "sixth information", respectively. ISO/IEC14443-4 and NDEF are an example of "specific standard conforming to predetermined standard" and "predetermined format", respectively. The error display of S164 of FIG. 3 is an example of "impossible information". The state of the authentication flag 38 being "OFF" and the state of the authentication flag 38 being "ON" are an example of "first operating state" and "second operating state", respectively.

Figure 5:
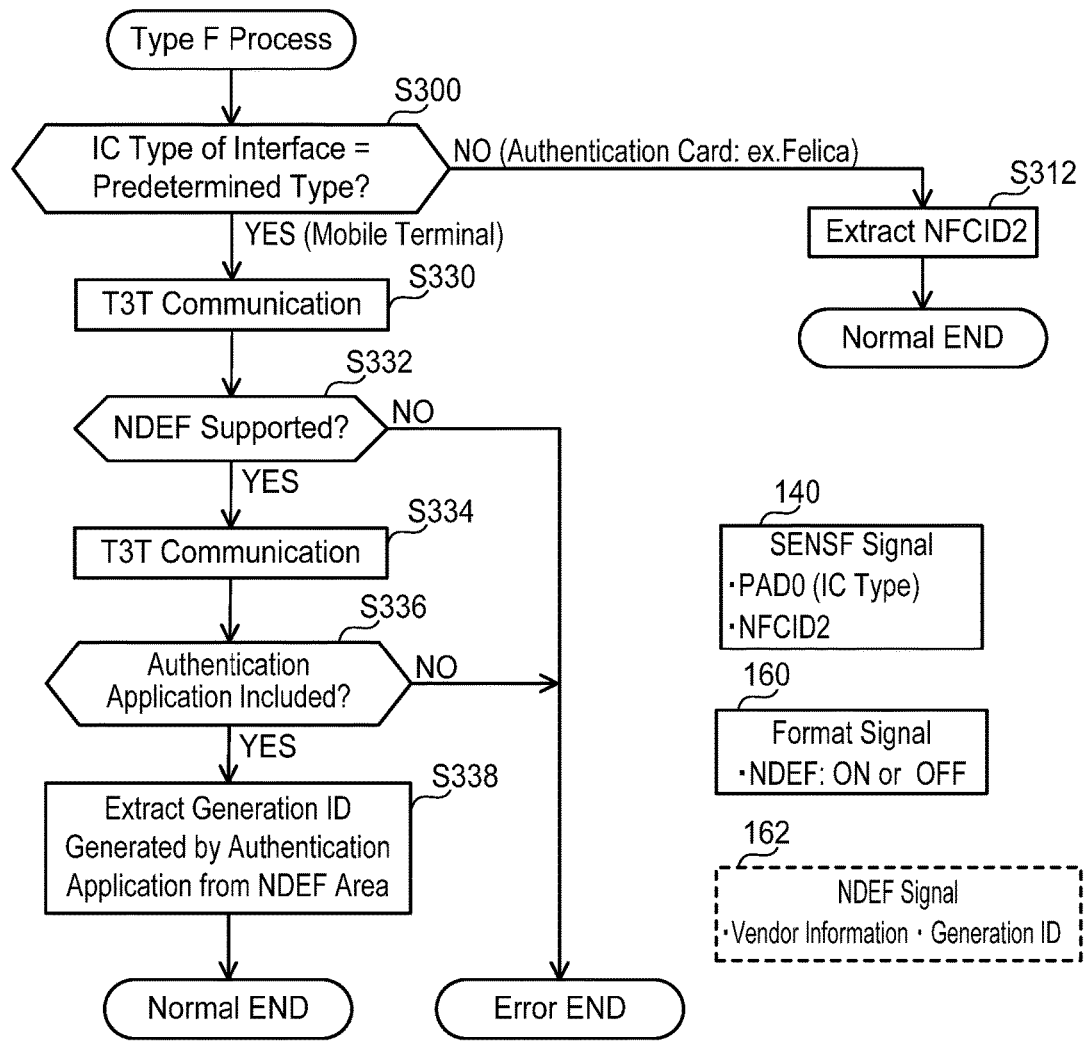
FIG. 5 shows a flowchart of an ID extraction process corresponding to type F.
Figure 6:
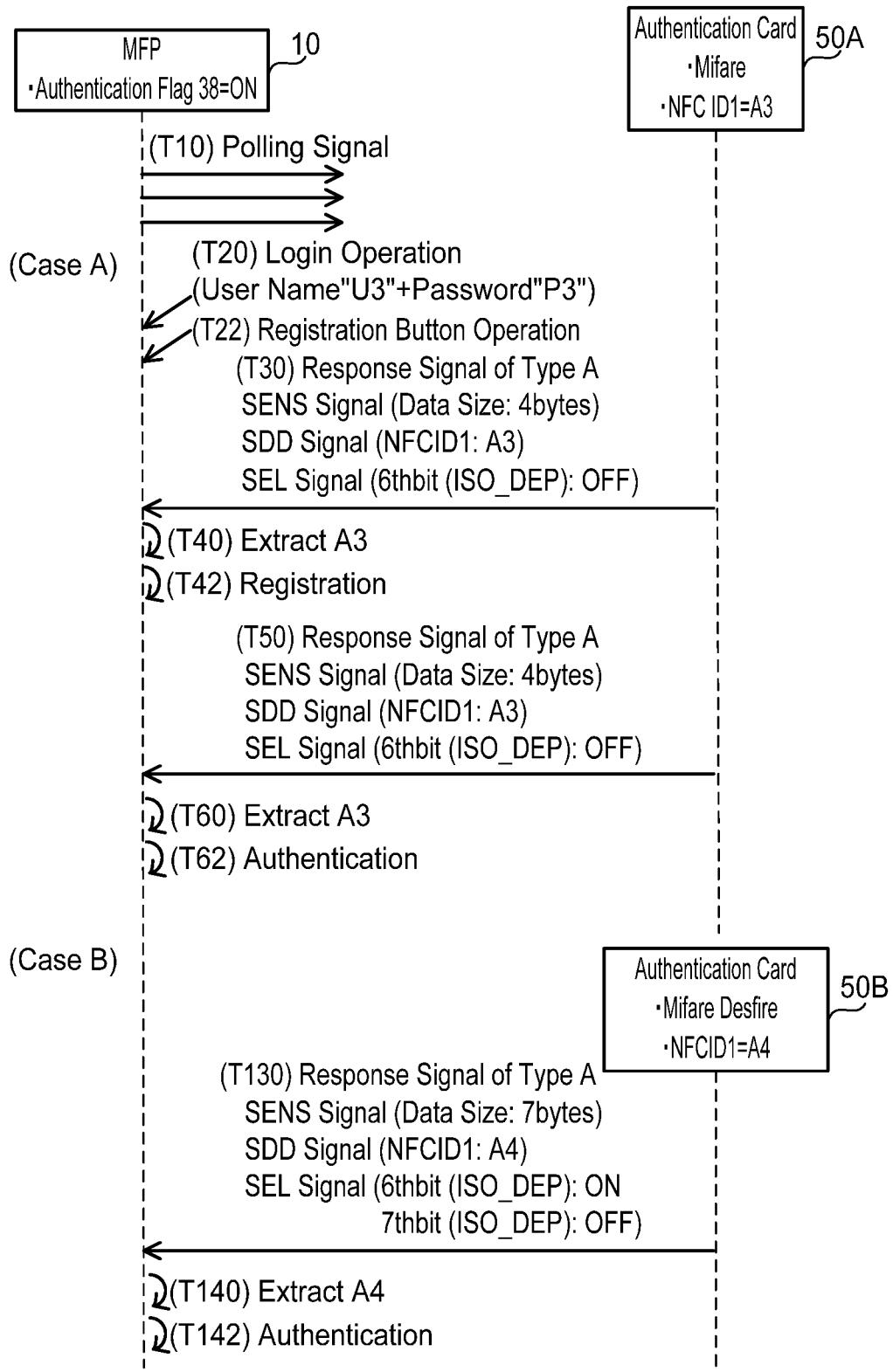
FIG. 6 shows a sequence diagram of a case of authenticating an authentication card corresponding to type A.

S200, S220, S222 of FIG. 4, and S300 of FIG. 5 are an example of "determine which of a first type device or a second type device the target device is". S232 of FIG. 4 and S332 of FIG. 5 are an example of "determine whether or not the target device supports the predetermined format". S236 of FIG. 4 and S336 of FIG. 5 are an example of "determine whether or not the target device comprises the predetermined application software".

(Modification 1) In case of determining YES in S110 of FIG. 3, the CPU 32 may change the mode state of the NFC I/F 22 to a mode state in which P2P mode, R/W mode, and CE mode are all ON. In this state, the CPU 32 can perform the print function, as in FIG. 2. Further, in case of determining YES in S120, the CPU 32 may change the mode state of the NFC I/F 22 to a mode state in which P2P mode and CE mode are OFF, and R/W mode is ON. In this case, the CPU 32 can appropriately perform the process for extracting the ID from the target device and registering the ID (S130 to S142). In the present modification, also, the state of the authentication flag 38 being "OFF", and the state of the authentication flag 38 being "ON" are an example of "first operating state" and "second operating state", respectively. In another viewpoint, a state in which the registration button has not been operated after the login operation, and a state in which the registration button has been operated are "first operating state" and "second operating state", respectively. Further, in another modification, the mode state of the NFC I/F 22 may be fixed to a mode state in which at least R/W mode is ON. That is, "set (or change) a mode state of the wireless interface" can be omitted.

(Modification 2) The order of the processes of S220, S222, and S230 of FIG. 4 may be different. For example, the CPU 32 may first perform the process of S222, and perform the processes of S220 and S230 in the case of NO in S222.

(Modification 3) For example, in an environment where a Mifare Desfire type authentication card is not used, S220 and S222 of FIG. 4 may be omitted and, in the case of YES in S200, it may be determined that the target device is a mobile terminal. Further, e.g., in an environment where a mobile terminal that is not capable of performing P2P communication is not used, S222 may be omitted, and it may be determined that the target device is a mobile terminal in the case of YES in S200, and it may be determined that the target device is an authentication card in the case of NO in S220. Further, e.g., in an environment where a Mifare type authentication card is not used, S200 may be omitted, and the processes from S220 onward may be omitted. That is, "determine which of a first type device or a second type device the target device is by using the attribute information" may not be performed by using all the first to third information.

(Modification 4) For example, in an environment where the target device corresponding to type A is not used, the entire process of FIG. 4 may be omitted. In this case, the process of FIG. 5 corresponding to type F is performed. That is, "determine which of a first type device or a second type device the target device is by using the attribute information" may be performed by using the fourth information without using any of the first to third information. Further, e.g., in an environment where the target device corresponding to type F is not used, the entire process of FIG. 5 may be omitted. In this case, the process of FIG. 4 corresponding to type A is performed. That is, "determine which of a first type device or a second type device the target device is by using the attribute information" may be performed by using the first to third information without using the fourth information.

(Modification 5) The generation ID may be described in a predetermined area in the signal received by the T4T communication of S230 of FIG. 4. In this case, after performing S230, the CPU 32 extracts the generation ID from the predetermined area. Consequently, S232 to S236 can be omitted. That is, "determine whether or not the target device supports the predetermined format" and "determine whether or not the target device comprises the predetermined application software" can be omitted.

(Modification 6) The CPU 32 may receive the user information (the user name and the password) instead of the generation ID in S234 of FIG. 4 and S334 of FIG. 5. For example, when the user activates the authentication application 78, a screen on which the user information can be input is displayed on the mobile terminal 70. When the user inputs the user information registered in the user table 40, the mobile terminal 70 stores the inputted user information. When the user brings the mobile terminal 70 close to the MFP 10 and the NFC communication has been established between the MFP 10 and the mobile terminal 70, in S234 and S334 the CPU 32 receives the NDEF signal including the user information from the mobile terminal 70. In this case, in S238 and S338, the CPU 32 extracts the user information from the NDEF signal and determines that authentication has succeeded in a case where that user information and the user information registered in the user table 40 match. In the present modification, the CPU 32 does not need to perform registration of the authentication ID. Consequently, the processes of S120, and S130 to S144 of FIG. 3 can be omitted. That is, "register the first identification information in the memory" and "register the second identification information in the memory" can be omitted.

(Modification 7) Registration of the authentication ID in the user table 40 may be performed by the administrator operating the operation unit 12. In this case, S120, and S130 to S144 of FIG. 3 can be omitted. That is, "register the first identification information in the memory" and "register the second identification information in the memory" can be omitted.

(Modification 8) For example, in a case where the target device is the mobile terminal 70 corresponding to type A, the one response signal received in S130 or S150 of FIG. 3 may include all of: the information indicating the data size of the NFCID1, the NFCID1, information on whether ISO_DEP and NFC_DEP are supported, the Format information, and the NDEF area. That is, "first signal" and "second signal" may be the same signal. Further, e.g., in FIG. 7, the MFP 10 may receive the T4T response signal earlier than the respective response signals of type A. That is, "second signal" may be received earlier than "first signal". Generally speaking, the order of receiving the "first signal" and "second signal" is not restricted.

(Modification 9) In S10 of FIG. 2, the CPU 32 may set the mode state of the NFC I/F 22 to a mode state in which only CE mode is ON. In this case, in S12, the CPU 32 monitors whether a CE-R/W communication link is established in which the NFC I/F 22 operates in CE mode and the NFC I/F 72 operates in R/W mode. The processes of S14 to S24 are the same as the embodiment described above. However, as a result of S16, the NFC I/F 22 sends the wireless setting to the mobile terminal 70 via the CE-R/W communication link. Generally speaking, "first mode state" may be any state in which at least one of P2P mode and CE mode is active.

(Modification 10) The user table 40 may store shortcut information indicating a shortcut function. The shortcut information may be information indicating, e.g., scan setting, scan data destination, etc. In this case, in a case where authentication of the target device has succeeded (S162), the CPU 32 performs a scan according to the scan settings included in the shortcut information corresponding to the authentication ID for which authentication has succeeded, and then sends scan data to the destination included in the shortcut information.

(Modification 11) "Wireless interface" may not be an I/F for performing NFC communication, but may be an I/F for performing a wireless communication complying with another communication system, e.g., BlueTooth (registered trademark), TransferJet (registered trademark), etc.

(Modification 12) "Communication device" may not be the MFP 10 that is capable of performing a plurality of functions, but may be a printing device capable of performing only the print function, or a scanner device capable of performing only the scan function.

(Modification 13) In the above embodiment, each process of FIG. 2 to FIG. 5 is implemented by the CPU 32 of the MFP 10 performing the program 36 (i.e., software). Instead, at least one process of the processes FIG. 2 to FIG. 5 may be implemented by hardware such as a logic circuit.

What is claimed is:
1. A communication device comprising:
a wireless interface configured to perform a wireless communication according to a predetermined standard;
a processor; and
a memory storing computer-readable instructions therein, the computer-readable instructions, when executed by the processor, causing the communication device to:
receive a first signal including first identification information and attribute information from a target device via the wireless interface by using a first communication layer and not using a second communication layer that is higher than the first communication layer;

determine which of a first type device or a second type device the target device is by using the attribute information;

execute an authentication of the target device by using the first identification information in a case where it is determined that the target device is the first type device; and execute an authentication of the target device by using second identification information different from the first identification information in a case where it is determined that the target device is the second type device and a second signal including the second identification information is received from the target device via the wireless interface by using the second communication layer, the second signal being sent to the communication device from the second type device in accordance with a predetermined application software.

2. The communication device as in claim 1, wherein the attribute information includes first information indicating a data size of the first identification information, it is determined that the target device is the first type device in a case where the first information indicates that the data size of the first identification information is a first data size, and it is determined that the target device is the second type device in a case where the first information indicates that the data size of the first identification information is a second data size different from the first data size.

3. The communication device as in claim 1, wherein the attribute information includes second information indicating whether or not the target device is a device complying with a specific standard conforming to the predetermined standard, it is determined that the target device is the first type device in a case where the second information indicates that the target device is not the device complying with the specific standard, and it is determined that the target device is the second type device in a case where the second information indicates that the target device is the device complying with the specific standard.

4. The communication device as in claim 1, wherein the attribute information includes third information indicating whether or not the target device is capable of performing bidirectional communication via the wireless interface, it is determined that the target device is the first type device in a case where the third information indicates that the target device is not capable of performing the bidirectional communication, and it is determined that the target device is the second type device in a case where the third information indicates that the target device is capable of performing the bidirectional communication.

5. The communication device as in claim 1, wherein the attribute information includes fourth information indicating an IC (abbreviation of Integrated Circuit) type of an interface of the target device, it is determined that the target device is the first type device in a case where the fourth information indicates that the IC type is not of a predetermined type, and it is determined that the target device is the second type device in a case where the fourth information indicates that the IC type is of the predetermined type.

6. The communication device as in claim 5, wherein the attribute information includes the fourth information in a first case where a communication type for receiving the first signal is a first communication type, and the attribute information does not include the fourth information but includes first information indicating a data size of the first identification information in a second case where the communication type for receiving the first signal is a second communication type different from the first communication type, wherein the computer-readable instructions, when executed by the processor, cause the communication device to:

determine which of the first type device or the second type device the target device is by using the fourth information in the first case; and determine which of the first type device or the second type device the target device is by using the first information in the second case, wherein it is determined that the target device is the first type device in a case where the first information indicates that the data size of the first identification information is a first data size, and it is determined that the target device is the second type device in a case where the first information indicates that the data size of the first identification information is a second data size different from the first data size.

7. The communication device as in claim 1, wherein the second signal includes fifth information indicating whether or not the target device supports a predetermined format, the computer-readable instructions, when executed by the processor, further cause the communication device to:

determine whether or not the target device supports the predetermined format by using the fifth information in a case where it is determined that the target device is the second type device;

output impossible information indicating that it is impossible to execute an authentication of the target device, in a case where it is determined that the target device does not support the predetermined format; and extract the second identification information from a predetermined area that is included in the second signal and complying with the predetermined format, in a case where it is determined that the target device supports the predetermined format.

8. The communication device as in claim 1, wherein the second signal includes sixth information indicating whether or not the target device comprises the predetermined application software, the computer-readable instructions, when executed by the processor, further cause the communication device to:

determine whether or not the target device comprises the predetermined application software by using the sixth information in a case where it is determined that the target device is the second type device;

output impossible information indicating that it is impossible to execute an authentication of the target device, in a case where it is determined that the target device does not comprise the predetermined application software; and extract the second identification information included in the second signal, in a case where it is determined that the target device comprises the predetermined application software.

9. The communication device as in claim 1, wherein
the computer-readable instructions, when executed by the processor, further cause the communication device to:
register the first identification information in the memory in a case where a registration instruction for registering identification information is given and it is determined that the target device is the first type device; and
register the second identification information in the memory in a case where the registration instruction is given and it is determined that the target device is the second type device,
wherein the authentication of the target device by using the first identification information is executed in a case where the registration instruction is not given and it is determined that the target device is the first type device, and
the authentication of the target device by using the second identification information is executed in a case where the registration instruction is not given and it is determined that the target device is the second type device.

10. The communication device as in claim 1, wherein
the computer-readable instructions, when executed by the processor, further cause the communication device to:
receive the second signal from the target device in the case where it is determined that the target device is the second type device,
wherein the second signal is not received in the case where it is determined that the target device is the first type device.

11. The communication device as in claim 1, wherein
the predetermined standard is a NFC (abbreviation of Near Field Communication) standard, and
the wireless interface is a NFC forum device.

12. The communication device as in claim 11, wherein
the computer-readable instructions, when executed by the processor, further cause the communication device to:
set a mode state of the wireless interface to a first mode state in a case where an operating state of the communication device is a first operating state, the first mode state being a state in which at least one mode of P2P (abbreviation of Peer to Peer) mode and CE (abbreviation of Card Emulation) mode of the NFC standard is active, and
change the mode state of the wireless interface from the first mode state to a second mode state in a case where the operating state of the communication device is changed from the first operating state to a second operating state, the second mode state being a state in which the at least one mode is inactive and R/W (abbreviation of Reader/Writer) mode of the NFC standard is active.

13. The communication device as in claim 1, wherein
the first type device is a card, and
the second type device is a terminal device.

14. A communication device comprising:
a wireless interface configured to perform a wireless communication according to a predetermined standard;
a processor; and
a memory storing computer-readable instructions therein, the computer-readable instructions, when executed by the processor, causing the communication device to:
receive a first signal including first identification information and attribute information from a target device via the wireless interface;
determine which of a first type device or a second type device the target device is by using the attribute information;
execute an authentication of the target device by using the first identification information in a case where it is determined that the target device is the first type device;
receive a second signal including second identification information from the target device in a case where it is determined that the target device is the second type device, the second identification information being different from the first identification information, the second signal being sent to the communication device from the second type device in accordance with a predetermined application software, wherein the second signal is not received in the case where it is determined that the target device is the first type device; and
execute an authentication of the target device by using the second identification information in the case where it is determined that the target device is the second type device.

15. The communication device as in claim 14, wherein
the predetermined standard is a NFC (abbreviation of Near Field Communication) standard, and
the wireless interface is a NFC forum device.

16. The communication device as in claim 14, wherein
the first type device is a card, and
the second type device is a terminal device.

17. A communication device comprising:
a wireless interface configured to perform a wireless communication according to a predetermined standard;
a processor; and
a memory storing computer-readable instructions therein, the computer-readable instructions, when executed by the processor, causing the communication device to:
receive a first signal including first identification information and attribute information from a target device via the wireless interface, the attribute information including at least one of first information, second information, third information and fourth information, the first information indicating a data size of the first identification information, the second information indicating whether or not the target device is a device complying with a specific standard conforming to the predetermined standard, the third information indicating whether or not the target device is capable of performing bidirectional communication via the wireless interface, and the fourth information indicating an IC (abbreviation of Integrated Circuit) type of an interface of the target device;
determine which of a first type device or a second type device the target device is by using the attribute information;
execute an authentication of the target device by using the first identification information in a case where it is determined that the target device is the first type device; and
execute an authentication of the target device by using second identification information different from the first identification information in a case where it is determined that the target device is the second type device and a second signal including the second identification information is received from the target device via the wireless interface, the second signal being sent to the communication device from the second type device in accordance with a predetermined application software.

18. The communication device as in claim 17, wherein the attribute information includes the first information,
it is determined that the target device is the first type device in a case where the first information indicates that the data size of the first identification information is a first data size, and
it is determined that the target device is the second type device in a case where the first information indicates that the data size of the first identification information is a second data size different from the first data size.

19. The communication device as in claim 17, wherein the attribute information includes the second information,
it is determined that the target device is the first type device in a case where the second information indicates that the target device is not the device complying with the specific standard, and
it is determined that the target device is the second type device in a case where the second information indicates that the target device is the device complying with the specific standard.

20. The communication device as in claim 17, wherein the attribute information includes the third information,
it is determined that the target device is the first type device in a case where the third information indicates that the target device is not capable of performing the bidirectional communication, and
it is determined that the target device is the second type device in a case where the third information indicates that the target device is capable of performing the bidirectional communication.

21. The communication device as in claim 17, wherein the attribute information includes the fourth information,
it is determined that the target device is the first type device in a case where the fourth information indicates that the IC type is not of a predetermined type, and
it is determined that the target device is the second type device in a case where the fourth information indicates that the IC type is of the predetermined type.

22. The communication device as in claim 17, wherein the predetermined standard is a NFC (abbreviation of Near Field Communication) standard, and
the wireless interface is a NFC forum device.

23. The communication device as in claim 17, wherein the first type device is a card, and
the second type device is a terminal device.

* * * * *